United States Patent [19]
Powell et al.

[11] 3,722,852
[45] Mar. 27, 1973

[54] RELIEF VALVE

[75] Inventors: Walter W. Powell, Houston, Tex.; Dennis L. Howland, Oceano, Calif.

[73] Assignee: Anderson, Greenwood & Co., Houston, Tex.

[22] Filed: Mar. 12, 1971

[21] Appl. No.: 123,762

Related U.S. Application Data

[62] Division of Ser. No. 808,797, March 20, 1969, Pat. No. 3,583,432.

[52] U.S. Cl. ..................251/61.2, 251/175, 251/333
[51] Int. Cl. ...........................................F16k 25/00
[58] Field of Search.............251/61.1, 61.2, 333, 175

[56] References Cited

UNITED STATES PATENTS

| | | | |
|---|---|---|---|
| 3,115,329 | 12/1963 | Wing et al. | 251/175 X |
| 2,808,934 | 10/1957 | Rivas | 251/61.1 X |
| 2,693,823 | 11/1954 | Sogge | 251/61.1 X |
| 2,393,427 | 1/1946 | Sparrow | 251/61.2 X |
| 3,055,629 | 9/1962 | Jurs et al. | 251/333 X |
| 3,394,732 | 7/1968 | Lisciani | 251/333 X |
| 3,159,377 | 12/1964 | Samour | 251/175 |

*Primary Examiner*—Arnold Rosenthal
*Attorney*—J. Vincent Martin, Joe E. Edwards, M. H. Gay, Alfred H. Evans and Jack R. Springgate

[57] ABSTRACT

An improved pressure vacuum relief valve having a pressure energized seat, a secondary seat with a stop adapted to be used with a pilot valve to relieve a vacuum condition and with two pilot valves to relieve pressure and vacuum conditions. This abstract is neither intended to define the invention of the application which, of course, is measured by the claims, nor is it intended to be limiting as to the scope of the invention in any way.

5 Claims, 6 Drawing Figures

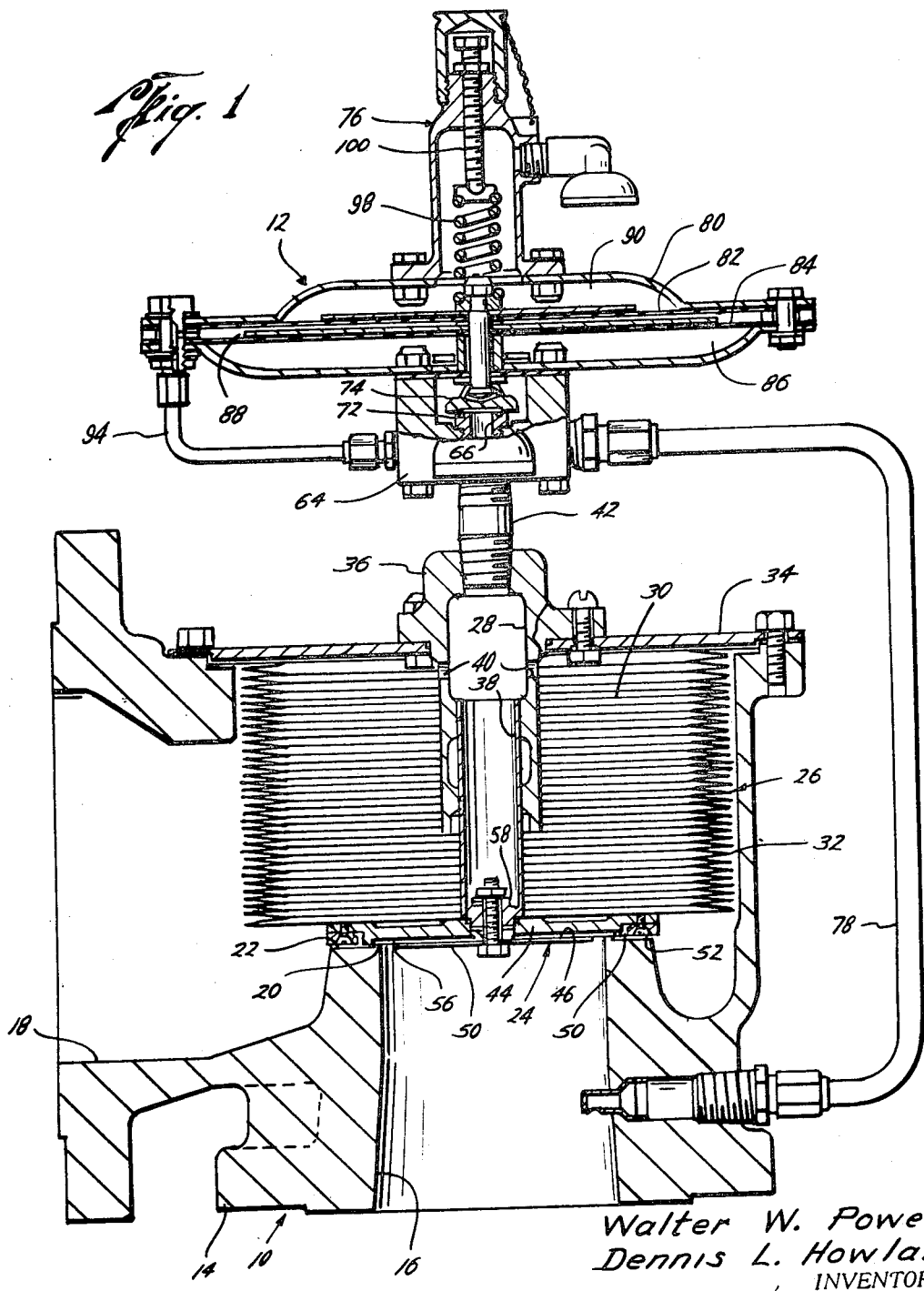

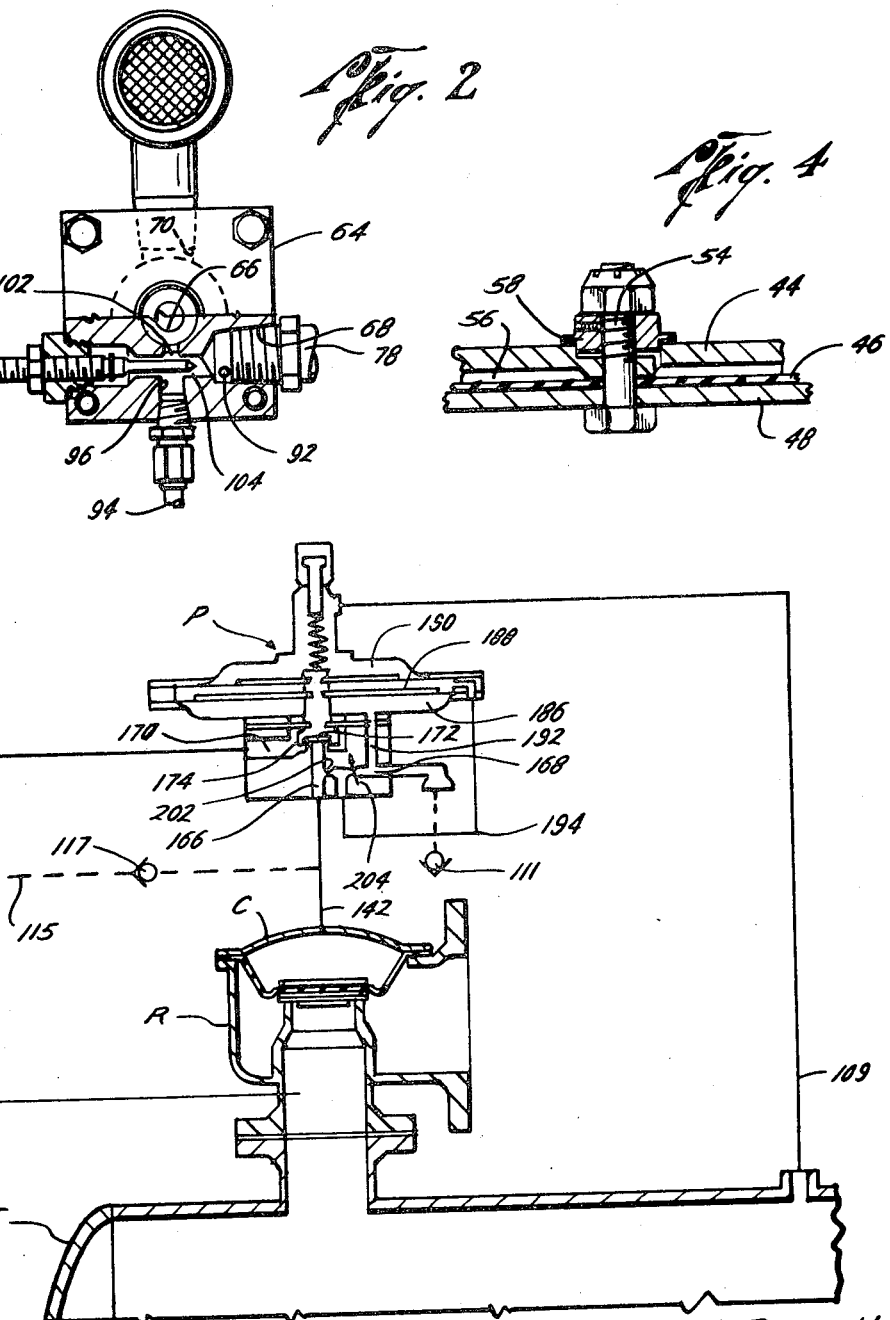

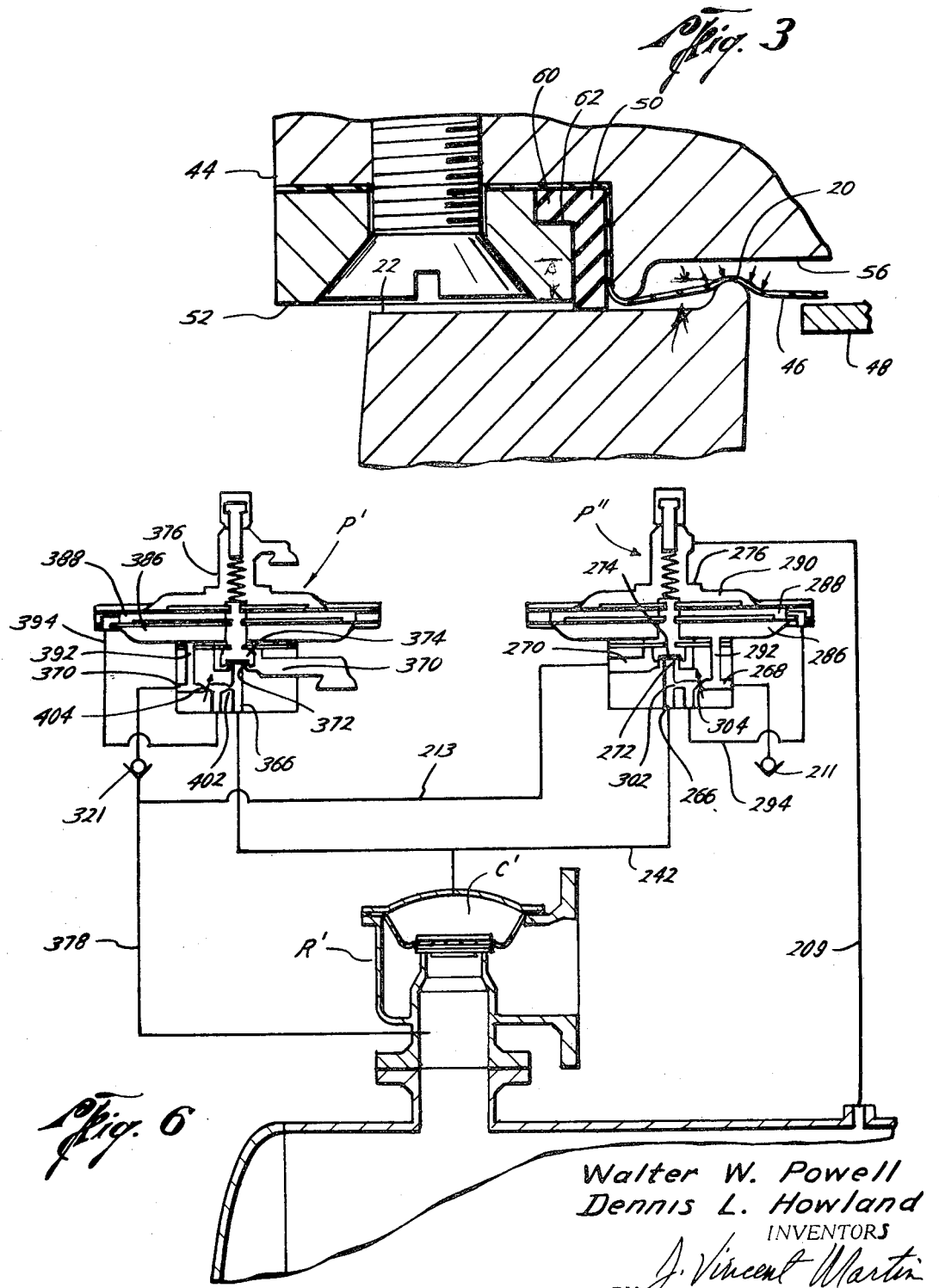

RELIEF VALVE

RELATED APPLICATIONS

This application is a divisional application based on our earlier filed copending application Ser. No. 808,797, filed Mar. 20, 1969 now U. S. Pat. No. 3,583,432.

SUMMARY

The present invention relates to an improved relief valve and to a combination of relief and pilot valves suitable for use to relieve vacuum conditions and to relieve both pressure and vacuum conditions.

An object of the present invention is to provide an improved relief valve having positive sealing.

A further object is to provide an improved relief valve which can utilize pressure in its pressure responsive means to assure positive seating under only minor pressure differentials.

Another object is to provide an improved relief valve and pilot valve combination having improved protection for a container against vacuum conditions.

Still another object is to provide an improved combination of relief valve and pilot valves having improved protection for a container against pressure and vacuum conditions.

BRIEF DESCRIPTION OF THE DRAWINGS

These and other objects and advantages are hereinafter described and explained with reference to the drawings wherein:

FIG. 1 is a sectional view of the improved main relief valve and pilot valve of the present invention for relieving against vacuum conditions.

FIG. 2 is a partial sectional view of the pilot valve.

FIG. 3 is a partial enlarged sectional view of the improved seating of the main relief valve.

FIG. 4 is an enlarged detail sectional view of the main valve member illustrating the communication providing the improved pressure sealing of the present invention.

FIG. 5 is a schematic diagram of a combined relief valve and pilot valve used for relieving vacuum conditions.

FIG. 6 is a schematic diagram of a combined relief valve and two pilot valves used for relief of both pressure and vacuum conditions.

DESCRIPTION OF THE PREFERRED EMBODIMENTS

The relief valve system illustrated in FIG. 1 includes a main relief valve 10 and a pilot valve 12 connected to provide protection against excess pressure. As hereinafter explained, the same combination main relief valve 10 and pilot valve 12 may also be connected to provide vacuum protection, and with two such pilot valves to provide both pressure and vacuum protection.

The main relief valve 10 includes the body 14 having the ports 16 and 18 with the seat 20 surrounding communication through body 14 between the ports 16 and 18. The annular sealing surface 22 is defined by the body 14 immediately surrounding the seat 20 and the seat 20 projects slightly beyond the plane of sealing surface 22 as shown. The main relief valve 10 also includes a valve member 24, pressure responsive means 26 connected to actuate the valve member 24 and a port 28 communicating with the chamber 30 defined by the body 14 and pressure responsive means 26. As shown in FIG. 1, the pressure responsive means 26 is a bellows 32 and the chamber 30 is formed by the bellows 32 and the cover 34 which is secured to body 14. The port 28 is defined in fitting 36 which is secured to cover 34 and extends within the bellows 32 to receive the guide sleeve 38. Guide sleeve 38 is secured to the end of bellows 32 secured to valve member 24 and extends axially within bellows 32 and is slidable in fitting 36 to guide valve member 24 in its movement. Fitting 36 is provided with the holes 40 to provide communication into chamber 30. The outer end of fitting 36 is internally threaded to receive the pipe 42 which extends to the pilot valve 12 as hereinafter explained.

The valve member 24 includes the circular plate 44 which is connected to the inner end of bellows 32, the seating membrane 46, the membrane support plate 48, the annular seal 50 and the annular stop 52. Bolt 54 secures the seating membrane or diaphragm 46 and the support plate 48 to the plate 44. The side of plate 44 facing diaphragm 46 defines an annular recess 56. Communication is provided from the interior of sleeve 38 through the bushing 58 and plate 44 to the recess 56 so that dome pressure (the control pressure maintained in chamber 30 by pilot valve 12) is exerted on diaphragm 46. The outer periphery of diaphragm 46 is secured to plate 44 by the annular seal 50 and the annular stop 52. Seal 50 includes an outwardly extending flange 60 which is positioned in the recess 62 in stop flange 52. As best seen in FIG. 3, the axially extending portion 52. As best seen in FIG. 3, the axially extending portion of seal 50 extends beyond stop 52 so that as valve member 24 closes, the seal 50 engages sealing surface 22 before stop 52 engages sealing surface 22. As can be seen from FIG. 3, the stop 52 engages the surface 22 before the diaphragm 46 is clamped between valve seat 20 and the bottom of recess 56 since the depth of recess 56 above stop 52 is greater than the distance from seat 20 to surface 22. This prevents damage to diaphragm by crushing.

Initial sealing of the valve member 24 on seat 20 is provided by the diaphragm 46. As shown in FIG. 3, the diaphragm 46 is urged by the pressure toward and around the projection forming seat 20. The arrows within recess 56 illustrate the pressure acting on diaphragm 46 to provide sealing when seated.

The pilot valve 12 includes the body 64 having ports 66, 68 and 70 with valve seat 72 surrounding communication between ports 66 and 70, the valve member 74 movable to open and close flow through valve seat 72 and the actuator 76 connected to move valve member 74 responsive to the pressures delivered thereto. Pressure from port 16 of main valve 10 is communicated through line 78 to port 68. Pipe 42 is connected into port 66 so that pilot valve 12 controls the pressure within chamber 30 and therefore the actuation of valve member 24.

Actuator 76 is provided with the case 80 and the diaphragms 82 and 84 which together form the sensing diaphragms 82 and 84, the boost chamber 88 and the upper chamber 90. The diaphragms 82 and 84 are movable in the chambers 86, 88 and 90 responsive to pressure differentials and are connected to valve member 74 to thereby control the movement of valve member 74.

Port 92 communicates from port 68 to sensing chamber 86, line 94 connects from port 96 to boost chamber 88 and upper chamber 90 is vented. Spring 98 biases the diaphragms and valve member 74 toward seated position and is adjustable by rotation of screw 100. As best seen in FIG. 2, port 96 communicates with both ports 66 and 68 at a position between fixed restriction 102 and the variable restriction 104.

Thus, when the pressure in port 16 exceeds the maximum desired pressure, the pressure in sensing chamber 86 lifts valve member 74 off seat 72 to relieve the pressure in chamber 30 and thereby cause valve member 24 to lift off seat 20 to relieve the excess pressure in the container to which valve 10 is connected. The reduction in pressure in port 16 responsive to relieving is communicated to sensing chamber 86 causing pilot valve 12 to close, delivering increased pressure to chamber 30 to cause main valve 10 to close. When pilot valve 12 is open, flow occurs through variable restriction 104 and through fixed restriction 102 to provide two pressure drops so that the pressure at port 96 is below the pressure in port 68 and above the pressure in port 66. This intermediate pressure at port 96 is the pressure in boost chamber 88. The adjustment of the variable restriction 104 controls the relative pressures in chambers 86 and 88 of actuator 76. With little or no restriction provided by this variable restriction 104, the pressure in the chambers will remain substantially the same. Since the effective pressure area of the upper diaphragm is smaller than that of the lower diaphragm, pressure in the boost chamber 88 thereby decreases the net lifting force of the pressure responsive means against the spring 98. Also, by varying this restriction to provide a maximum pressure drop, the net lifting force on the diaphragms is increased as soon as there is flow in the line allowing the boost chamber 88 to be substantially reduced in pressure with respect to the sensing chamber 86.

The diagram of FIG. 5 shows the combination of a pilot valve P and a relief valve R connected to relieve a vacuum condition in tank T. Pilot valve P controls the actuation of relief valve R by controlling the pressure in the chamber C of relief valve R. In the diagram, pilot valve P is the same as pilot valve 12 previously described and relief valve R may be the same as the main valve 10 previously described or any other suitable relief valve which functions responsive to the pressure differentials between the chamber C and the port in communication with tank T. The hook-up of pilot valve P and relief valve R for such vacuum relief service is as shown in FIG. 5.

Port 166 is connected to chamber C by pipe 142. The vacuum conditions in tank T are communicated to upper chamber 190 of actuator 176 by line 109. Atmospheric pressure is delivered through check valve 111, port 168 and port 192 to sensing chamber 186, through variable restriction 204 and line 194 to boost chamber 188 and through fixed restriction 202 to port 166. Valve member 174 controlled by actuator 176 when engaging seat 172 closes communication between ports 166 and 170. Line 113 connects port 170 to the tank side port of relief valve R. Bypass line 115 with check valve 117 therein communicates between line 113 and pipe 142 so that increases in pressure in tank T are communicated through lines 113, 115, check valve 117 and pipe 142 to chamber C but reverse flow is prevented.

The vacuum relief of the combination shown in FIG. 5 functions to open relief valve R allowing flow of external air at atmospheric pressure into tank T whenever the vacuum condition in tank T exceeds the maximum desired vacuum. The reduction in pressure is sensed in chamber 190 and when it exceeds the minimum desired pressure, the pressure differentials on actuator 176 opens valve member 174. This exhausts the pressure in chamber C allowing valve R to open.

From this, it can be seen that the pilot valve when connected as shown in FIG. 5 to the relief valve R causes the relief valve R to open allowing atmospheric air to flow therethrough into the tank T to relieve excess vacuum conditions within the tank T. Also, whenever pressure above atmospheric is present in the tank T, such pressure is conducted through the line 113, the bypass 115, the check valve 117 to the chamber C. This assures that the relief valve R remains closed since the effective pressure area of the relief valve responsive to the pressure in chamber C is greater than the effective pressure area of the relief valve responsive to the pressure within the port connected to tank T.

As is shown in FIG. 6, the pilot valves P' and P'' are connected to the relief valve R' to provide relief for both pressure and vacuum conditions within the tank T'. The pilot valve P' functions to relieve the pressure within the chamber C' of relief valve R' whenever pressure conditions within the tank T' exceed the preselected maximum desired pressure thereby allowing relief of pressure through relief valve R'. The pilot valve P'' is connected to relieve the pressure in the chamber C' allowing the relief valve to open to permit the flow of air into the tank T' whenever the vacuum conditions exceed a preselected maximum vacuum or a preselected minimum absolute pressure.

As shown, the pilot valve P' is connected with respect to the relief valve R' in a manner similar to the connection illustrated in FIG. 1 and the pilot valve P'' is connected to the relief valve R' in a manner similar to the connection illustrated in FIG. 5. Since two pilot valves are being used, the connections to the chamber C' of valve R' is the manifold 242 connecting to the port 366 of the pilot valve P' and to port 266 of the pilot valve P''. The line 209 connects from the tank T' to the pilot valve P'' to communicate vacuum conditions to the upper or third chamber 290 of pressure responsive means or actuator 276. Atmospheric pressure is conducted to the chamber 286 through check valve 211, port 268 and port 292. Pressure is communicated from the port 268 through variable restriction 304 through the line 294 to the chamber 288. Port 266 and manifold 242 are in communication with port 268 through variable restriction 304 and fixed restriction 302. The communication between port 266 and port 270 is surrounded by the valve seat 272 and flow therethrough is controlled by valve member 274 responsive to the movement of the pressure responsive means 276. Lines 378 and 213 communicate from the inlet of relief valve R' to the port 270.

The pilot valve P' having its port 366 connected to the chamber C' of relief valve R' by the manifold 242 is also connected to the inlet of the relief valve R' by the line 278 which communicates through the check valve 321 to the port 370. This pressure is communicated through the passage 392 to the chamber 386 of pressure responsive means or actuator 376. Pressure is communicated from the port 370 through the variable restriction 404 and the line 394 to the chamber 388 of the means 376. Communication from port 370 to port 366 extends through the variable restriction 404 and the fixed restriction 402. The valve seat 372 surrounds communication between the port 366 and the vent port 370 and flow therethrough is controlled by the valve member 374 responsive to the movement of the pressure responsive means 376.

With the combination of the two pilot valves P' and P'' connected as shown in FIG. 6 to control the relieving operation of the main relief valve R', relief of pressure conditions exceeding a preselected maximum desired pressure in tank T' and exceeding preselected maximum vacuum or minimum absolute pressure condition in tank T' are relieved. Whenever vacuum conditions exceed the preselected maximum vacuum, such conditions are communicated through line 209 to the chamber 290 in the actuator 276 causing the valve 274 to unseat. When valve 274 unseats, full communication is established to the inlet of relief valve R' from the chamber C' through the manifold 242, the ports 266 and 270, the line 213 and the line 378. This causes the pressure in the chamber C' to be reduced to the pressure existing within the tank T'. With a pressure less atmospheric in the chamber C', the atmospheric pressure from the port of valve R' which is exposed to atmosphere causes the valve R' to open allowing flow of air into the tank T' to relieve the vacuum conditions exceeding the preselected maximum desired vacuum conditions.

Whenever pressure in the tank T exceeds the preselected desired pressure therein, such pressure is communicated through line 378, check valve 321, port 370, passage 392 to the chamber 386 to cause the pilot valve to open placing the chamber C' in communication with the vent port 370 through the manifold 242, the port 366 and the valve seat 372. With the pressure vented from chamber C', relief valve R' opens responsive to the pressure conditions within its inlet to allow fluids from tank T' to vent therefrom. As may be seen, whenever relief valve R' is open either responsive to pressure or vacuum conditions as soon as adequate relief has been achieved, the relief valve R' closes responsive to an increase in pressure delivered to the chamber C' from the controlling one of the pilot valves P' and P''.

From the foregoing, it can be seen that the present invention provides an improved combination for the control of vacuum and for the control of both pressure and vacuum conditions by use of a single means relief valve. Additionally the present invention provides as an improved combination, a main relief valve having improved sealing on its seat including both a main pressure responsive sealing responsive to the pressure in the control or dome chamber of the relief valve and also secondary sealing associated with a limit stop on the valve member.

What is claimed is:
1. A relief valve comprising,
a body having a first port, a second port and a valve seat surrounding communication between said ports,
a valve member adapted to move to and from engagement with said valve seat,
pressure responsive means connected to move said valve member in response to pressure delivered to said pressure responsive means,
said valve member defining a recess on the seating side thereof and having a diaphragm secured to said valve member in covering relation to said recess and adapted to engage said valve seat,
said valve member also providing communication to said recess from said pressure responsive means whereby when said diaphragm is in engagement with said valve seat, the pressure from said pressure responsive means urges said diaphragm into complete sealing engagement with said valve seat,
said diaphragm being spaced from said valve member by said recess in the annular area of said diaphragm opposite the portion of said diaphragm engaging said valve seat,
said body also having an annular flat sealing surface surrounding said valve seat and spaced from said valve seat away from said diaphragm, and
a seal ring carried by said valve member and adapted to engage said sealing surface when said valve member is in seated position with respect to said valve seat to seal between said valve member and said sealing surface.
2. A relief valve according to claim 1, including
a stop ring secured to said valve member,
said stop ring being adapted to engage said sealing surface to limit further seating movement of said valve member.
3. A relief valve according to claim 2, wherein
said stop ring retains said seal on said valve member, and
said seal projects from said valve member beyond said stop ring whereby said seal engages said sealing surface on seating prior to the engagement of said sealing surface by said stop ring.
4. A relief valve comprising,
a body having a first port, a second port and a valve seat surrounding communication between said ports,
a valve member adapted to move to and from engagement with said valve seat,
a bellows mounted in said body and connected to move said valve member in response to pressure delivered to said pressure responsive means,
said valve member defining a recess on the seating side thereof and having a diaphragm secured to said valve member in covering relation to said recess and adapted to engage said valve seat,
said valve member also providing communication to said recess from said bellows whereby when said diaphragm is in engagement with said valve seat, the pressure from said bellows urges said diaphragm into complete sealing engagement with said valve seat, said diaphragm being spaced from said valve member by said recess in the annular area of said diaphragm opposite the portion of said diaphragm engaging said valve seat,
a cover secured to said body and closing the opposite end of said bellows from the end connected to said valve member,
a fitting extending through said cover to provide communication into said bellows, and a sleeve secured within said bellows and extending axially of said bellows and slidable within said fitting to guide the movement of said valve member to and from engagement with said seat.

5. A relief valve comprising, a body having a first port, a second port and a valve seat surrounding communication between said ports, a valve member adapted to move to and from engagement with said valve seat, pressure responsive means connected to move said valve member in response to pressure delivered to said pressure responsive means, said valve member defining a recess on the seating side thereof having a diameter larger than the diameter of said valve seat, a diaphragm secured to said valve member in covering relation to said recess and adapted to engage said valve seat, a valve member also providing communication to said recess from said pressure responsive means whereby when said diaphragm is in engagement with said valve seat, the pressure from said pressure responsive means urges said diaphragm into complete sealing engagement with said valve seat, said diaphragm being spaced from said valve member by said recess in the annular area of said diaphragm on the side opposite the portion of said diaphragm engaging said valve seat, said body having an annular flat surface surrounding said valve seat and spaced below said valve seat away from said diaphragm, a stop ring carried by said valve member having a surface facing said flat surface, and the depth of said recess above said stop ring surface being greater than the spacing of said flat annular surface from said valve seat whereby said stop ring surface engages said annular flat surface to avoid clamping of said diaphragm between said valve member and said valve seat.

* * * * *